Dec. 12, 1939.  F. P. BECKER  2,183,003
HYDRAULIC SHOCK ABSORBER
Filed Jan. 2, 1937  2 Sheets-Sheet 1
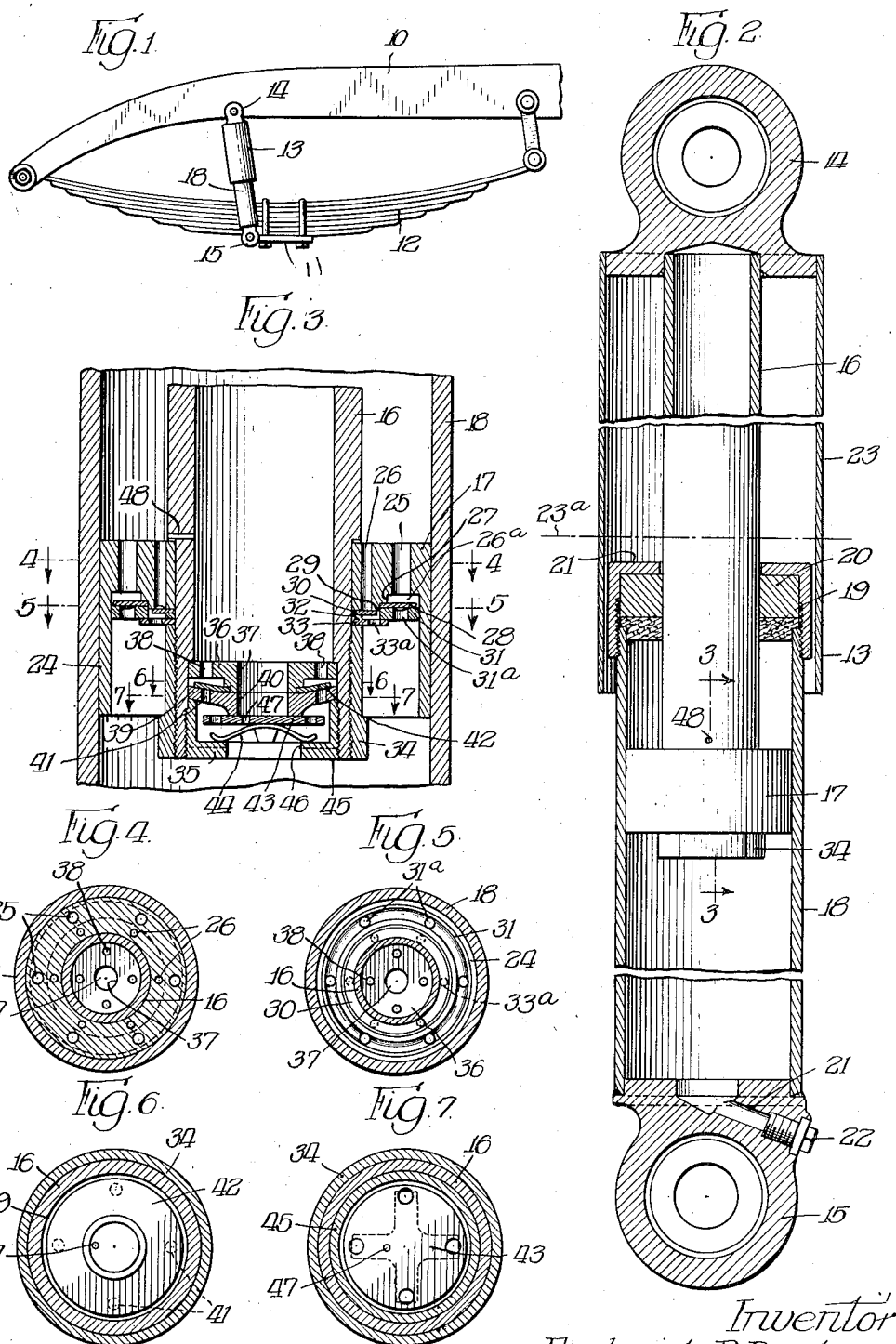
Inventor:
Frederich P. Becker Dec. 12, 1939.  F. P. BECKER  2,183,003
HYDRAULIC SHOCK ABSORBER
Filed Jan. 2, 1937  2 Sheets-Sheet 2
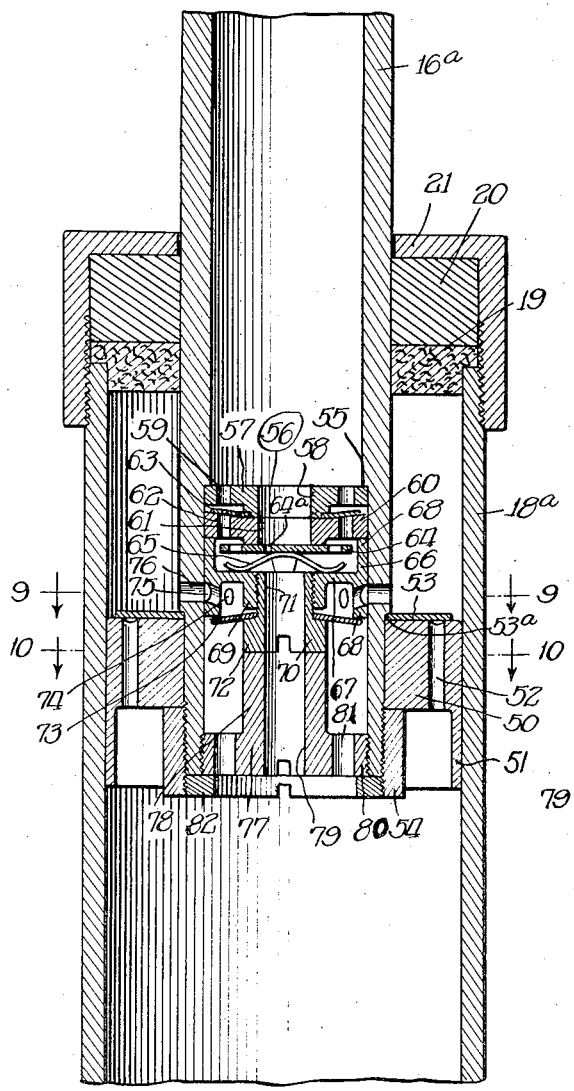
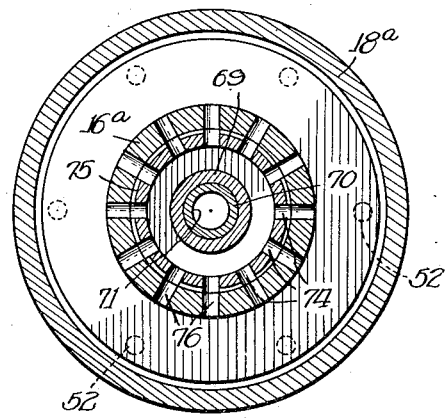
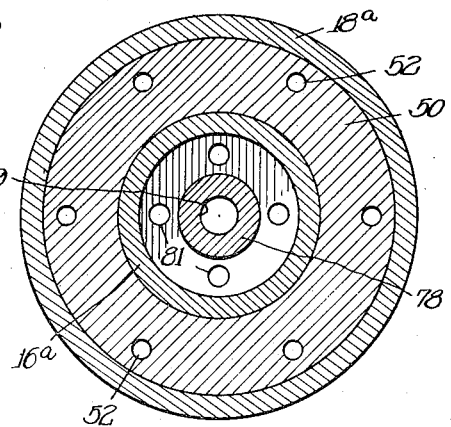
Inventor:
Frederick P. Becker, Patented Dec. 12, 1939

2,183,003

UNITED STATES PATENT OFFICE 2,183,003

HYDRAULIC SHOCK ABSORBER

Frederick P. Becker, Chicago, Ill.

Application January 2, 1937, Serial No. 118,813

22 Claims. (Cl. 188—88)

The present invention relates to hydraulic shock absorbers.

An object of the present invention is to provide an improved shock absorber which is of relatively small size and which is made up of inexpensive parts.

A further object is to provide an improved shock absorber of the type in which a ported piston moves within a cylinder, in which the piston rod for said piston constitutes a reservoir for hydraulic medium, and in which simple valve means are provided for permitting the passage to and from said reservoir.

A further object is to provide a hydraulic shock absorber which will hold its resistance to the flow of hydraulic medium on rebound regardless of the tendency common to spring members to lose their resiliency in service.

A further object is to provide a hydraulic shock absorber which while efficient in checking moderate shocks will also be effective to check violent shocks.

A further object is to provide a shock absorber of the hydraulic type which is simple in design and construction and reliable in service.

Further objects will appear as the description proceeds.

This application is a continuation in-part of application Serial No. 60,841, entitled Hydraulic shock absorbers, filed January 25, 1936, by the present applicant.

Referring to the drawings—

Figure 1 is a diagrammatic view showing an assembly in which an embodiment of the present invention is applied to a motor car;

Figure 2 is a longitudinal sectional view illustrating an embodiment of the present invention;

Figure 3 is a sectional view, on an enlarged scale, of part of the structure shown in Figure 2;

Figure 4 is a sectional view taken along the plane indicated by the arrows 4—4 of Figure 3;

Figure 5 is a sectional view taken along the plane indicated by the arrows 5—5 of Figure 3;

Figure 6 is a sectional view taken along the broken section indicated by the arrows 6—6 of Figure 3;

Figure 7 is a sectional view taken along the broken section indicated by the arrows 7—7 of Figure 3;

Figure 8 is a sectional view similar to Figure 3 but showing a modification;

Figure 9 is a sectional view taken along the plane indicated by the arrows 9—9 of Figure 8; and Figure 10 is a sectional view taken along the plane indicated by the arrows 10—10 of Figure 8.

In describing the illustrated embodiments of the present invention it may be stated first of all that the invention contemplates a construction which includes a ported piston carried by a piston rod adapted to be pivotally secured to part of a motor car, which piston is adapted to reciprocate within a cylinder which may be pivotally connected to another part of a motor car, which parts of the motor car are resiliently connected together. The cylinder referred to will contain oil or other fluid, and the ported piston referred to is adapted to reciprocate through said oil, the interior of the piston rod in certain aspects of the invention acting as a reservoir for the hydraulic fluid which must be accommodated due to the differences in the effective diameter of the cylinder on that side of the piston to which the piston rod is connected and the effective diameter at the other side of said piston. The invention contemplates a novel arrangement of valve means for controlling the ports in the piston referred to and in controlling the flow of hydraulic medium between said cylinder and the interior of said piston rod.

Referring to Figure 1, the numeral 10 indicates part of the frame of a motor car, and the numeral 11 indicates an assembly which in service will be more or less rigid with respect to the axle of a motor car. The numeral 12 indicates a spring assembly which connects the rigid assembly 11 with the frame 10 in the manner common in motor cars. Pivotally connected at one end to the frame 10 and pivotally connected at the other end to the rigid assembly 11 is the shock absorber 13 forming the subject matter of the present invention.

The means for connecting the shock absorber 13 to the frame 10 and to the rigid assembly 11 form no part of the present invention. The particular means chosen for illustration are the eye members 14 and 15. Said eye member 14 has rigidly secured thereto the piston rod 16, which in the practice of the present invention will be hollow. At the lower end of said piston rod 16 is the piston 17. The other eye member 15 has secured thereto the cylinder 18 for receiving said piston 17. Said cylinder 18 is closed at both ends, the end opposite to the eye member 15 being provided with readily removable closure means. Said closure means includes the washer 19, which may be of fiber or other composition, having a shoulder fitting over the adjacent extremity of the cylinder 18. Disposed outwardly of the washer 19 is the cushioning or packing member 20, which member 20 is held in place by the cap member 21, which has a screw-threaded flange having threaded engagement with the adjacent extremity of the cylinder 18. The closure means comprising the washer 19, member 20 and cap member 21 provide a fluid-tight joint permitting reciprocation of the piston rod 16 therethrough. The eye member 15 is provided with the aperture 22 adapted to be closed by the screw-threaded plug 22. Said aperture 21 communicates with the interior of the cylinder 18 and provides means for filling oil or other hydraulic medium into the cylinder 18 or withdrawing said medium therefrom when a change of such medium is desired. Carried by the eye member 14 is the skirt 23, which has the function of protecting to a certain degree the reciprocating portions of the shock absorber from flying stones and other foreign matter. The broken line 23a indicates the approximate oil level within the piston rod 16 under conditions as represented in Figure 2.

The piston 17 is provided with the skirt 24 having a substantially cylindrical inner wall. Extending through the piston are a plurality of circumferentially disposed ports 25—25. Also extending through the piston in the embodiment illustrated in Figure 3 are a plurality of circumferentially disposed ports 26, the ports 26 being disposed nearer to the axis of the piston 16 than are the ports 25. Communicating with the ports 25—25 at the lower side of the piston is the circumferential recess 26a, which recess provides the annular shoulder 27, upon which abuts the annular disk valve 28. Disposed inwardly and downwardly with respect to the annular shoulder 27 is the annular shoulder 29. The disk valve 28 is disposed radially between the annular shoulder 29 and the inner surface of the skirt 24 of the piston 17. Engaging the under side of the piston 17 in closing relationship with the ports 26—26 is the annular disk valve 30. Disposed outwardly in a radial direction with respect to the annular disk valve 30 is the annulus 31, which is provided with a series of ports 31a—31a adapted to be closed by the annular disk valve 28 but adapted to communicate with the annular recess 26a when said annular disk valve 28 is unseated from the annulus 31. Disposed below the annular disk valve 30 is the annular washer 32 and disposed in holding relationship with said annular washer 32 and abutting against the under side of the annulus 31 is the annulus 33, which annulus 33 is provided with the ports 33a—33a communicating with the space between the annulus 33 and the annular disk valve 30. The piston 17, the annular disk valve 30, the annular washer 32 and the annulus 33 are disposed in encircling relationship with a reduced portion at the extremity of the piston rod 16, and the assembly of said members is held in fixed relationship with the piston rod 16 by means of the nut 34, which has screw-threaded engagement with the end portion of the piston rod 16.

Disposed at the lower extremity of the hollow piston rod 16 is a valve assembly, indicated as a whole by the numeral 35, which valve assembly has the function of controlling the flow of fluid between the chamber below the piston 17 and the interior of the hollow piston rod 16. Said valve assembly includes the disk 36 provided with the relatively large central aperture 37 and the circumferentially disposed apertures 38—38. Said disk 36 is adapted to abut longitudinally against an annular shoulder provided in the inner wall of the hollow piston 16. Disposed below the disk 36 is the disk 39. Said disk 39 is provided with a central aperture 40 coinciding with the central aperture 37 and is also provided with the circumferentially disposed apertures 41—41 adapted to communicate with the apertures 38—38 of the disk 36. Said disks 36 and 39 have abutting relationship adjacent to their central portions but provide a space for the annular disk valve 42, which is biased to closing relationship with the apertures 41—41 whereby to stop the flow of fluid from the interior of the hollow piston rod 16 to the chamber below the piston 17. Said annular disk valve 42 is adapted to flex upwardly, however, to permit the flow of fluid from the chamber below the piston 17 to the interior of the hollow piston rod 16. Disposed in abutting relationship with the under side of the disk 39 is the disk 43 spring-pressed into closing relationship with the aperture 40 by means of the spring 44. Said spring 44 has abutting relationship with the cup-shaped plug member 45, which is exteriorly screw-threaded to cooperate with the interiorly screw-threaded extremity of the hollow piston rod 16. Said cup-shaped plug member 45 is provided with the central aperture 46 coinciding with the apertures 40 and 37 of the disks 39 and 36, respectively. Said disk 43 may be sufficiently large in diameter to ride freely within the interior of the cup-shaped plug member 45, but should permit the flow of fluid from the aperture 46 upwardly through the apertures 41 of the disk member 39. The disk member 43 is provided with the bleeder hole 47. The hollow piston rod 16 may, if preferred, be provided with the bleeder hole 48 providing restricted communication between the interior of the hollow piston rod 16 and the region above the piston 17.

In the operation of the embodiment of the present invention illustrated in Figure 3, the cylinder 18 will be substantially filled with oil or other fluid medium. The quantity of oil should be sufficient to fill the cylinder 18 when the piston 17 is at the outermost end of its stroke, and in addition the interior of the hollow piston rod 16 should be partially filled.

When the vehicle to which the present invention is attached encounters a bump of the nature which would cause the eye members 14 and 15 to approach each other, the chamber below the piston 17 will, of course, become smaller and the chamber above said piston 17 will become larger. Due, however, to the presence of the piston rod 16, the capacity of the chamber below the piston 17 will decrease much more rapidly than the capacity of the chamber above the piston 17 will increase. Under the action of a bump such as referred to, oil will flow upwardly past the annular disk valve 28 and at the same time oil will pass upwardly through the aperture 46 in the cup-shaped plug member at the extremity of the hollow piston rod 16 past the annular disk valve 42 into the reservoir within said hollow piston rod 16. Due to the relatively free flow of oil as immediately above described, the shock absorber will not present a great amount of resistance to the action of the spring assembly 12. The functions of the shock absorber will become effective, however, upon the rebound. For the purpose of checking the rebound, the oil within the cylinder 18 should present a relatively effective check upon the movement of the piston 17. For this purpose the freedom of movement of the piston 17 through the oil is restricted by reason of a lesser total cross-sectional area of the ports 26—26 than the corresponding cross-sectional area of the ports 25. The annular disk valve 30 can also be designed to limit the freedom of the flow of oil from the chamber above the piston 17 to the space below said piston 17. Consistently with the statement made above relative to the presence of the piston rod 16, the capacity of the chamber below the piston 17 increases more rapidly per increment of movement of the piston 17 than the capacity of the chamber above said piston 17 decreases. On the rebound movement under discussion, movement of the piston 17 upwardly will result in sufficient reduction of pressure within the chamber below the piston 17 to cause the opening movement of the disk 43 relative to the disk 39, permitting the flow of oil from the reservoir within the piston rod 16 into the chamber below the piston 17.

The annular disk valve 30 will be flexed downwardly to permit oil to flow downwardly through the ports 26—26. When a violent flexing of the spring assembly 12 occurs and there is a tendency for a violent rebound, said disk valve 30 will move into partial obstructing relationship with the ports 33a, whereby the rebound will be checked with increased effectiveness. The construction referred to has the advantage that if the disk valve 30 should tend to lose part of its resiliency in service, it will still be effective in checking rebounds.

By reason of the bleeder opening 47 in the disk 43, slow movements of oil into and out of the reservoir within the piston rod 16 will be permitted to compensate for small bumps. Said bleeder opening 47 will cooperate with the disk valve 42 on the larger bumps. The bleeder opening 48 in the piston rod 16 will permit relief of air pressure within the chamber above the piston 17 due to the mixture of air with the oil caused by reciprocation of said piston 17 through the oil in an atmosphere of air. The level of oil in the hollow piston rod 16 will be above the top of the cylinder 18. The preferred amount of oil in the shock absorber may be chosen as desired to produce the desired smoothness of action.

Referring now to the embodiment of the invention disclosed in Figures 8, 9 and 10, the piston rod 16a is provided adjacent to its lower extremity with the piston 50, which piston is slidably disposed within the cylinder 18a. Said piston 50 may be provided with the skirt 51. Extending longitudinally through the piston are a plurality of circumferentially disposed ports 52—52. Disposed at the side of the piston 50 toward the piston rod end of the cylinder 18a is the annular disk valve 53. Said disk valve and piston 50 encircle a reduced end portion of the piston rod 16a, said annular disk valve 53 abutting against an annular shoulder 53a of said piston rod 16a. Said annular disk valve 53 is adapted to control the ports 52—52, permitting passage of liquid through said ports from the side of the piston 50 distant from the piston rod 16a to the opposite side of said piston but stopping flow of liquid from the piston rod side of said piston to the side opposite to said piston rod. The piston 50 and the annular disk valve 53 are held in position by means of the nut 54 threaded upon the extremity of the piston rod 16a.

Mounted interiorly of the piston rod 16a and abutting against the annular shoulder 55 is a valve assembly indicated as a whole by the numeral 56. Said valve assembly includes the disk 57 provided with the relatively large central aperture 58 and the circumferentially disposed apertures 59—59. Disposed below the disk 57 is the disk 60. Said disk is provided with a central aperture 61 coinciding with the central aperture 58 and is also provided with the circumferentially disposed apertures 62—62 adapted to communicate with the apertures 59—59 of the disk 57. Said disks 57 and 60 have abutting relationship adjacent to their central portions but provide a space for the annular disk valve 63, which is biased to closing relationship with the apertures 62—62, whereby to stop the flow of fluid from the interior of the hollow piston rod 16 to the region below the disk 60. Said annular disk valve 63 is adapted to flex upwardly, however, to permit the flow of fluid from the region below the disk 60 to the interior of hollow piston rod 16a. Disposed in abutting relationship with the under side of the disk 60 is the disk 64 spring-pressed into closing relationship with the aperture 61 by means of the spring 65. Said disk 64 is preferably provided with the bleeder opening 64a communicating with the aperture 61. Said spring 65 has abutting relationship with the base wall of the double cup member 66, which base wall is indicated by the numeral 67. Extending upwardly and downwardly from said base wall is the cylindrical wall 68 fitting within the hollow piston rod 16a. The upper edge of said wall 68 abuts longitudinally against the under side of the disk 60. Said base wall 67 is also provided with a downwardly extending boss 69, which is centrally apertured for the reception of the screw-threaded plug 70. Said screw-threaded plug 70 is provided with the central aperture 71 disposed coaxially with the aperture 61 of the disk 60 and the aperture 58 of disk 57. Said plug 70 is provided with the head 72. Mounted in encircling relationship with the plug 70 and adapted to be abutted longitudinally by the head 72 thereof is the annular disk valve 73, the periphery of which is positioned in longitudinal abutting relationship with the wall 68 of the double cup member 66. The wall 68 is provided with the radial apertures 74—74 spaced circumferentially around said wall, said radial apertures being connected circumferentially on the outer side of the wall 68 by the groove 75. The hollow piston rod 16a is provided with the radial apertures 76 communicating with the groove 75 and the radial apertures 74—74. By turning up upon the screw-threaded plug 70 the tension of the annular disk valve 73 may be adjusted whereby to control the pressure required for opening said disk valve 73.

Disposed in longitudinally abutting relationship with the plug 70 is the plug 77 having the elongated boss 78. Said plug 77 has screw-threaded relationship with the inner wall of the hollow piston rod 16a and is provided with a central aperture 79 coinciding with the aperture 71 of the plug 70. Said plug 77, by reason of its abutting relationship with the plug 70, has the function of holding the plug 70, the double cup member 66, disk 60 and disk 57 in fixed longitudinal relationship, the entire assembly abutting against the shoulder 55. The head portion 80 of the plug 77 is provided with a plurality of spaced apertures 81—81 providing communication between the space below the annular disk valve 73 and the space below the piston 50. The externally screw-threaded washer 82 is provided, for screw-threaded engagement, with the nut 54 for locking said nut, the plug 80 and the hollow piston rod 16a in fixed relationship with one another. Said washer 82 has a large central aperture whereby no interference will be had with the apertures 81—81.

In the operation of the construction illustrated in Figures 8, 9 and 10 the cylinder 18a will be substantially filled with oil or other fluid medium. The quantity of oil should be sufficient to fill the cylinder 18a when the piston 50 is at the outermost (that is—uppermost, as the parts are shown in the drawings) end of its stroke, and in addition the interior of the hollow piston rod 16a should be partially filled. Under the action of a bump which would cause the eye members 14 and 15 to approach each other, oil will flow upwardly past the annular disk valve 53 and at the same time oil will pass upwardly through the apertures 79—91 through the apertures in the disk valve 64 and past the annular disk valve 63 into the reservoir within the hollow piston rod 16a. Due to the relatively free flow of oil as immediately above described, the shock absorber will not present a great amount of resistance to the action of the spring assembly 12. The functions of the shock absorber will become effective, however, upon the rebound. As explained in connection with the embodiment disclosed in Figures 1 to 7, for the purpose of checking the rebound the oil within the cylinder 18a should present a relatively effective check upon the movement of the piston 50. For this purpose the freedom of movement of the piston 50 through the oil is restricted. To this end the total cross-sectional area of the passageways for oil comprising the ports 76 and 74, together with the effect of the disk valve 73, may be chosen in accordance with the desired restricting effect. As indicated above, the restricting effect of the annular disk valve 73 may be controlled by the position of the plug 70, which controls the tension of said annular disk valve 73. It will be understood, of course, that for permitting adjustment of the plug 70, the annular washer 82 and the plug 77 will be temporarily removed.

On the rebound movement under discussion, movement of the piston 50 upwardly will result in sufficient reduction of pressure within the chamber below said piston 50 to cause opening movement of the disk 64 relative to the disk 69, permitting the flow of oil from the reservoir within the piston rod 16a into the chamber below the piston 50. By reason of the bleeder opening 64a in the disk 64, slow movements of oil into and out of the reservoir within the piston rod 16a will be permitted to compensate for small bumps. Said bleeder opening 64a will cooperate with the disk valve 63 on the larger bumps.

Though certain preferred embodiments of the present invention have been described in detail, many modifications will occur to those skilled in the art. It is intended to cover all such modifications that fall within the scope of the appended claims.

What is claimed is—

1. In a shock absorber, in combination, a cylinder adapted to be closed at both ends, a ported piston within said cylinder, a hollow piston rod extending through one end of said cylinder and connected with said piston, and valve means for controlling communication between the interior of said piston rod and the space within said cylinder at the opposite side of said piston, said valve means including means permitting access of hydraulic medium into the interior of said piston rod from said cylinder but stopping flow of hydraulic medium from said piston rod to said cylinder, said valve means also including means responsive to a decrease in pressure within said cylinder at said opposite side below the pressure within said piston rod for controlling the flow of fluid from the interior of said piston rod to said cylinder.

2. In a shock absorber, in combination, a cylinder, a piston reciprocably mounted within said cylinder, a hollow piston rod connected with said piston and extending through one end of said cylinder, said piston having valved ports for permitting controlled restrained movement of said piston through hydraulic medium in said cylinder, valve means for controlling communication between the interior of said piston rod and the space within said cylinder at the opposite side of said piston, said valve means including means permitting access of hydraulic medium into the interior of said piston rod from said cylinder but stopping flow of hydraulic medium from said piston rod to said cylinder, the extremity of said piston rod located within said cylinder having an aperture, and a closure for said aperture biased to closed position but adapted to be opened when the pressure within said hollow piston rod exceeds the pressure within said cylinder adjacent to said extremity of said hollow piston rod.

3. In a shock absorber, in combination, a cylinder, a piston reciprocably mounted within said cylinder and having a hollow piston rod extending through one end of said cylinder, said piston having valved ports for permitting controlled restrained movement of said piston through hydraulic medium in said cylinder, said piston rod at its extremity within said cylinder being provided with a valve assembly, said valve assembly including valve means for controlling communication between the interior of said piston rod and the space within said cylinder at the opposite side of said piston, said valve means including means permitting access of hydraulic medium into the interior of said piston rod from said cylinder but stopping flow of hydraulic medium from said piston rod to said cylinder, said valve assembly also including a spring-pressed closure member providing access from the interior of said piston rod to the region of said cylinder opposite to said piston rod when the pressure within said piston rod exceeds the pressure within said region.

4. In a shock absorber, in combination, a cylinder, a piston reciprocably mounted within said cylinder and having a hollow piston rod extending through one end of said cylinder, said piston having valved ports for permitting controlled restrained movement of said piston through hydraulic medium in said cylinder, said piston rod at its extremity within said cylinder being provided with a valve assembly, said valve assembly including a closure member biased to closed position but providing access from the interior of said piston rod to the region of said cylinder opposite to said piston rod when the pressure within said piston rod exceeds the pressure within said region, said valve assembly having a bleeder opening for providing restricted communication between the interior of said piston rod and said region.

5. In a shock absorber, in combination, a cylinder, a piston reciprocably mounted within said cylinder and having a hollow piston rod extending through one end of said cylinder, said piston having valved ports for permitting controlled restrained movement of said piston through hydraulic medium in said cylinder, said piston rod at its extremity within said cylinder being provided with a valve assembly, said valve assembly including a spring-pressed closure member providing access from the interior of said piston rod to the region of said cylinder opposite to said piston rod when the pressure within said piston rod exceeds the pressure within said region, said piston rod being provided with a bleeder opening providing constant restricted communication between the interior of said piston rod and the region within said cylinder surrounding said piston rod.

6. In a shock absorber, in combination, a cylinder, a piston reciprocably mounted within said cylinder and having a hollow piston rod extending through one end of said cylinder, said piston having valved ports for permitting controlled restrained movement of said piston through hydraulic medium in said cylinder, said piston rod at its extremity within said cylinder being provided with a valve assembly, said valve assembly including a spring-pressed closure member providing access from the interior of said piston rod to the region of said cylinder opposite to said piston rod when the pressure within said piston rod exceeds the pressure within said region, said valve assembly having a bleeder opening for providing restricted communication between the interior of said piston rod and said region, said piston rod being provided with a bleeder opening providing constant restricted communication between the interior of said piston rod and the region within said cylinder surrounding said piston rod.

7. In a shock absorber, in combination, a cylinder adapted to contain fluid medium, a piston reciprocably mounted within said cylinder, said piston having a port and valve means permitting communication through said port when said piston is moved in one direction in said cylinder but stopping communication therethrough when said piston is moved in the opposite direction, said piston having another port and valve means for stopping movement of fluid medium through said last mentioned port when said piston is moved in said one direction relative to said cylinder but permitting controlled restrained movement of said fluid medium therethrough when said piston is moved in said opposite direction, a hollow piston rod for operating said piston, and a valve assembly for controlling communication between the interior of said piston rod and the region of said cylinder opposite to said piston rod.

8. In a shock absorber, in combination, a cylinder adapted to contain fluid medium, a piston reciprocably mounted within said cylinder, said piston having a port and valve means permitting communication through said port when said piston is moved in one direction in said cylinder but stopping communication therethrough when said piston is moved in the opposite direction, said piston having another port and valve means for stopping movement of fluid medium through said last mentioned port when said piston is moved in said one direction relative to said cylinder but permitting controlled restrained movement of said fluid medium therethrough when said piston is moved in said opposite direction, a hollow piston rod for operating said piston, and a valve assembly for controlling communication between the interior of said piston rod and the region of said cylinder opposite to said piston rod, said valve assembly having a bleeder opening for providing restricted communication between the interior of said piston rod and said region.

9. In a shock absorber, in combination, a cylinder adapted to contain fluid medium, a piston reciprocably mounted within said cylinder, said piston having a port and valve means permitting communication through said port when said piston is moved in one direction in said cylinder but stopping communication therethrough when said piston is moved in the opposite direction, said piston having another port and valve means for stopping movement of fluid medium through said last mentioned port when said piston is moved in said one direction relative to said cylinder but permitting controlled restrained movement of said fluid medium therethrough when said piston is moved in said opposite direction, a hollow piston rod for operating said piston, and a valve assembly for controlling communication between the interior of said piston rod and the region of said cylinder opposite to said piston rod, said piston rod being provided with a bleeder opening providing constant restricted communication between the interior of said piston rod and the region within said cylinder surrounding said piston rod.

10. In a shock absorber, in combination, a cylinder adapted to contain fluid medium, a piston reciprocably mounted within said cylinder, said piston having a port and valve means permitting communication through said port when said piston is moved in one direction in said cylinder but stopping communication therethrough when said piston is moved in the opposite direction, said piston having another port and valve means for stopping movement of fluid medium through said last mentioned port when said piston is moved in said one direction relative to said cylinder but permitting controlled restrained movement of said fluid medium therethrough when said piston is moved in said opposite direction, a hollow piston rod for operating said piston, and a valve assembly for controlling communication between the interior of said piston rod and the region of said cylinder opposite to said piston rod, said valve assembly having a bleeder opening for providing restricted communication between the interior of said piston rod and said region, said piston rod being provided with a bleeder opening providing constant restricted communication between the interior of said piston rod and the region within said cylinder surrounding said piston rod.

11. In a shock absorber, in combination, a cylinder adapted to contain fluid medium, a piston reciprocably mounted within said cylinder, said piston having a port and valve means permitting communication through said port when said piston is moved in one direction in said cylinder but stopping communication therethrough when said piston is moved in the opposite direction, said piston having another port and valve means for stopping movement of fluid medium through said last mentioned port when said piston is moved in said one direction relative to said cylinder but permitting controlled restrained movement of said fluid medium therethrough when said piston is moved in said opposite direction, a hollow piston rod for operating said piston, and a valve assembly for controlling communication between the interior of said piston rod and the region of said cylinder opposite to said piston rod, said valve assembly having port means and valve means for permitting flow of fluid from said region into the interior of said piston rod when said piston is moved inwardly of said cylinder but checking reverse movement of said fluid, said valve assembly having an aperture providing communication between the interior of said piston and said region, and spring-pressed means for closing said aperture, said spring-pressed means being adapted to be opened when the pressure within said cylinder exceeds the pressure in said region.

12. In a shock absorber, in combination, a cylinder adapted to contain fluid medium, a piston reciprocably mounted within said cylinder, said piston having a port and valve means permitting communication through said port when said piston is moved in one direction in said cylinder but stopping communication therethrough when said piston is moved in the opposite direction, said piston having another port and valve means for stopping movement of fluid medium through said last mentioned port when said piston is moved in said one direction relative to said cylinder but permitting controlled restrained movement of said fluid medium therethrough when said piston is moved in said opposite direction, a hollow piston rod for operating said piston, and a valve assembly for controlling communication between the interior of said piston rod and the region of said cylinder opposite to said piston rod, said valve assembly having port means and valve means for permitting flow of fluid from said region into the interior of said piston rod when said piston is moved inwardly of said cylinder but checking reverse movement of said fluid, said valve assembly having an aperture providing communication between the interior of said piston and said region, and spring-pressed means for closing said aperture, said spring-pressed means being adapted to be opened when the pressure within said cylinder exceeds the pressure in said region, said valve assembly having a bleeder opening for providing restricted communication between the interior of said piston rod and said region.

13. In a shock absorber, in combination, a cylinder adapted to contain fluid medium, a piston reciprocably mounted within said cylinder, said piston having a port and valve means permitting communication through said port when said piston is moved in one direction in said cylinder but stopping communication therethrough when said piston is moved in the opposite direction, said piston having another port and valve means for stopping movement of fluid medium through said last mentioned port when said piston is moved in said one direction relative to said cylinder but permitting controlled restrained movement of said fluid medium therethrough when said piston is moved in said opposite direction, a hollow piston rod for operating said piston, and a valve assembly for controlling communication between the interior of said piston rod and the region of said cylinder opposite to said piston rod, said valve assembly having port means and valve means for permitting flow of fluid from said region into the interior of said piston rod when said piston is moved inwardly of said cylinder but checking reverse movement of said fluid, said valve assembly having an aperture providing communication between the interior of said piston and said region, and spring-pressed means for closing said aperture, said spring-pressed means being adapted to be opened when the pressure within said cylinder exceeds the pressure in said region, said piston rod being provided with a bleeder opening providing constant restricted communication between the interior of said piston rod and the region within said cylinder surrounding said piston rod.

14. In a shock absorber, in combination, a cylinder adapted to contain fluid medium, a piston reciprocably mounted within said cylinder, said piston having a port and valve means permitting communication through said port when said piston is moved in one direction in said cylinder but stopping communication therethrough when said piston is moved in the opposite direction, said piston having another port and valve means for stopping movement of fluid medium through said last mentioned port when said piston is moved in said one direction relative to said cylinder but permitting controlled restrained movement of said fluid medium therethrough when said piston is moved in said opposite direction, a hollow piston rod for operating said piston, and a valve assembly for controlling communication between the interior of said piston rod and the region of said cylinder opposite to said piston rod, said valve assembly having port means and valve means for permitting flow of fluid from said region into the interior of said piston rod when said piston is moved inwardly of said cylinder but checking reverse movement of said fluid, said valve assembly having an aperture providing communication between the interior of said piston and said region, and spring-pressed means for closing said aperture, said spring-pressed means being adapted to be opened when the pressure within said cylinder exceeds the pressure in said region, said valve assembly having a bleeder opening for providing restricted communication between the interior of said piston rod and said region, said piston rod being provided with a bleeder opening providing constant restricted communication between the interior of said piston rod and the region within said cylinder surrounding said piston rod.

15. In a shock absorber, in combination, a cylinder, a piston mounted for reciprocation within said cylinder, a piston rod connected to said piston, said piston having a port, a valve for permitting movement of fluid medium through said port when said piston is moved in one direction and stopping movement of said fluid medium through said port when said piston is moved in the opposite direction, said piston having another port extending therethrough, said piston providing a space intermediate of said port, and valve means in said space, said valve means in its extreme open position being adapted to abut against a portion of said piston and to partially obstruct flow through said port.

16. In a shock absorber, in combination, a cylinder, a piston mounted for reciprocation within said cylinder, a piston rod for operating said piston, said piston having means for stopping movement of fluid medium therethrough in one direction while permitting movement of fluid medium therethrough in the opposite direction, said piston having a port extending therethrough, and a valve intermediate of the length of said port for stopping flow of fluid medium therethrough in said opposite direction but permitting restrained flow of fluid medium therethrough in said one direction, said valve in its extreme open position being adapted to abut against a portion of said piston and to partially obstruct said port.

17. In a shock absorber, in combination, a cylinder, a piston mounted for reciprocation within said cylinder, a piston rod for operating said piston, said piston having a port extending therethrough, and a valve cooperating with said port for stopping movement of fluid medium through said port when said piston is moved in one direction but permitting movement of said fluid medium through said port when said piston is moved in the opposite direction, said piston having a plurality of circumferentially spaced apertures extending therethrough, a resilient annular disk valve mounted intermediate of the length of the apertures in said piston for stopping flow of fluid medium through said apertures when said piston is moved in said opposite direction but permitting restrained flow of medium through said apertures when said piston is moved in said one direction, said disk valve in its extreme open position being adapted to abut against a portion of said piston and to partially obstruct said apertures.

18. In a shock absorber, in combination, a cylinder, a piston reciprocably mounted within said cylinder and having a hollow piston rod extending through one end of said cylinder, said piston having valved ports for permitting controlled, restrained movement of said piston through hydraulic medium in said cylinder, said piston rod adjacent to its extremity within said cylinder being provided with a valve assembly, said valve assembly including a spring-pressed closure member providing access from the interior of said piston rod to the region of said cylinder opposite to said piston rod when the pressure within said piston rod exceeds the pressure within said region, said piston rod having ports providing communication through the interior of said piston rod from the region exteriorly of said piston rod and the region within said cylinder on the opposite side of said piston, and valve means for controlling flow of liquid from said region exteriorly of said piston rod through the interior of said piston rod to the opposite side of said piston while stopping reverse flow of said liquid.

19. In a shock absorber, in combination, a cylinder, a piston reciprocably mounted within said cylinder and having a hollow piston rod extending through one end of said cylinder, said piston having valved ports for permitting controlled, restrained movement of said piston through hydraulic medium in said cylinder, said piston rod adjacent to its extremity within said cylinder being provided with a valve assembly, said valve assembly including a spring-pressed closure member providing access from the interior of said piston rod to the region of said cylinder opposite to said piston rod when the pressure within said piston rod exceeds the pressure within said region, said piston rod having ports providing communication through the interior of said piston rod from the region exteriorly of said piston rod and the region within said cylinder on the opposite side of said piston, valve means for controlling flow of liquid from said region exteriorly of said piston rod through the interior of said piston rod to the opposite side of said piston while stopping reverse flow of said liquid, and adjusting means carried by said valve assembly for controlling the tension of said valve means.

20. In a shock absorber, in combination, a cylinder, a reciprocable piston rod extending through one end of said cylinder, said piston rod having a piston mounted on one end thereof, said piston rod being hollow and having a valve assembly located adjacent to the piston end of said piston rod, said valve assembly having valve means adapted to be opened to permit flow of fluid into the interior of said hollow piston rod when said piston is moved inwardly from the piston rod end of said cylinder, said valve assembly being also provided with valve means adapted to permit communication from the interior of said hollow piston to the non-piston rod end of said cylinder when the pressure within said non-piston rod end of said cylinder falls below the pressure within said hollow cylinder.

21. In a shock absorber, in combination, a cylinder, a reciprocable piston rod extending through one end of said cylinder, said piston rod having a piston mounted on one end thereof, said piston rod being hollow and having a valve assembly located adjacent to the piston end of said piston rod, said valve assembly having valve means adapted to be opened to permit flow of fluid into the interior of said hollow piston rod when said piston is moved inwardly from the piston rod end of said cylinder, said valve assembly being also provided with valve means adapted to permit communication from the interior of said hollow piston to the non-piston rod end of said cylinder when the pressure within said non-piston rod end of said cylinder falls below the pressure within said hollow cylinder, said piston rod having ports providing communication between the piston rod region of said cylinder and the interior of said hollow piston rod, valve means for permitting access of liquid from the piston rod end of said cylinder to the opposite end thereof but stopping reverse flow of said liquid, and adjustment means for adjusting the tension of said valve means.

22. In a direct acting hydraulic shock absorber, a cyinder structure, a piston structure comprising a piston and a rod extending therefrom through one end of the cylinder structure, said rod being hollow to provide fluid reservoir space, valve means on the piston structure for controlling the flow of displaced fluid from one side of the piston to the other, means within said rod resistantly controlling flow of surplus fluid into the reservoir space, and means within the rod permitting free flow of fluid from the reservoir.

FREDERICK P. BECKER.